US012310284B2

(12) United States Patent
Merkt

(10) Patent No.: US 12,310,284 B2
(45) Date of Patent: May 27, 2025

(54) TURF TRIMMING SYSTEM AND INTEGRATED CONTROL SYSTEM

(71) Applicant: G2 Turftools, Inc., Athens, AL (US)

(72) Inventor: Eric Merkt, Athens, AL (US)

(73) Assignee: G2 Turftools, Inc., Athens, AL (US)

(*) Notice: Subject to any disclaimer, the term of this patent is extended or adjusted under 35 U.S.C. 154(b) by 766 days.

(21) Appl. No.: 17/678,494

(22) Filed: Feb. 23, 2022

(65) Prior Publication Data

US 2022/0174871 A1 Jun. 9, 2022

Related U.S. Application Data

(60) Continuation-in-part of application No. 16/863,965, filed on Apr. 30, 2020, now Pat. No. 11,291,159, which is a division of application No. 15/957,401, filed on Apr. 19, 2018, now Pat. No. 10,674,661.

(51) Int. Cl.
*A01D 34/86* (2006.01)
*A01D 34/00* (2006.01)
*A01D 34/66* (2006.01)
*A01D 34/76* (2006.01)
*A01D 34/81* (2006.01)
*A01D 34/84* (2006.01)
*A01D 101/00* (2006.01)

(52) U.S. Cl.
CPC ......... *A01D 34/863* (2013.01); *A01D 34/008* (2013.01); *A01D 34/661* (2013.01); *A01D 34/76* (2013.01); *A01D 34/81* (2013.01); *A01D 34/84* (2013.01); *A01D 2101/00* (2013.01)

(58) Field of Classification Search
CPC .... A01D 2101/00; A01D 34/81; A01D 34/86; A01D 34/835; A01D 34/866; A01D 34/66; A01D 34/863; A01D 34/008; A01D 34/661; A01D 34/76; A01D 34/84
See application file for complete search history.

(56) References Cited

U.S. PATENT DOCUMENTS

| 2,838,901 A | 6/1958 | Davis | |
| 3,241,302 A * | 3/1966 | Barry | A01D 34/863 56/16.2 |
| 3,715,872 A * | 2/1973 | Thompson, Jr. | A01D 34/863 56/16.9 |

(Continued)

FOREIGN PATENT DOCUMENTS

| AT | 512557 A1 * | 9/2013 | ........... A01D 34/863 |
| CA | 2948747 A1 * | 5/2018 | |

(Continued)

OTHER PUBLICATIONS

CIPO; Examination Search Report for Canadian Patent Application No. 3,039,189 dated Apr. 7, 2020.

(Continued)

*Primary Examiner* — Adam J Behrens
(74) *Attorney, Agent, or Firm* — Kirk A. Wilson; Joseph T. Guy; Patent Filing Specialist Inc.

(57) ABSTRACT

A motorized turf trimming system and method with integrated control for a carrier vehicle and rotary trimming attachments is disclosed. The system can be configured for automatically trimming around stationary objects such as trees, signposts, guard rail posts, barrier posts, light bases, etc.

6 Claims, 18 Drawing Sheets

(56) References Cited

U.S. PATENT DOCUMENTS

| | | | | |
|---|---|---|---|---|
| 4,901,508 | A | * | 2/1990 | Whatley ............... A01D 34/863 56/235 |
| 5,396,754 | A | * | 3/1995 | Fraley ................. A01D 34/863 56/15.5 |
| 5,826,414 | A | | 10/1998 | Lenczuk |
| 5,960,614 | A | * | 10/1999 | Jones ................... A01D 34/863 172/245 |
| 6,185,916 | B1 | * | 2/2001 | Johnson ............... A01D 34/863 56/16.7 |
| 6,591,592 | B1 | * | 7/2003 | Krimminger ........ A01D 34/863 56/13.6 |
| 6,860,093 | B2 | * | 3/2005 | Scordilis .............. A01D 34/863 56/15.2 |
| 7,363,754 | B2 | * | 4/2008 | Cartner ................ A01D 34/863 56/10.4 |
| 7,690,177 | B2 | * | 4/2010 | Spitzley ................. A01D 34/84 56/14.9 |
| 8,316,627 | B1 | * | 11/2012 | Fraley ................... A01D 34/84 56/13.6 |
| 8,713,904 | B1 | * | 5/2014 | Goudy ................... A01D 34/84 56/15.5 |
| 9,010,076 | B2 | * | 4/2015 | Hafner ................ A01D 34/866 56/6 |
| 9,167,738 | B1 | | 10/2015 | Serimian |
| 9,220,194 | B2 | | 12/2015 | Ulmefors et al. |
| 9,844,178 | B2 | | 12/2017 | Coutu |
| 2002/0174638 | A1 | * | 11/2002 | Borgesen ............. A01D 34/863 56/15.5 |
| 2005/0097873 | A1 | * | 5/2005 | Ferrari ................. A01D 34/863 56/12.7 |
| 2006/0026940 | A1 | * | 2/2006 | Cartner ................ A01D 34/863 56/11.9 |
| 2009/0249758 | A1 | * | 10/2009 | Weeden ............... A01D 34/863 56/15.7 |
| 2012/0328401 | A1 | * | 12/2012 | Sieben ................. A01D 34/835 414/728 |
| 2014/0260155 | A1 | * | 9/2014 | Goudy ................. A01D 34/863 56/15.5 |
| 2016/0366820 | A1 | * | 12/2016 | Goudy ................... A01D 34/73 |
| 2017/0118913 | A1 | * | 5/2017 | Coutu .................... A01D 43/00 |
| 2017/0150677 | A1 | | 6/2017 | Hoppel |
| 2019/0174672 | A1 | * | 6/2019 | Ku ....................... A01D 34/006 |
| 2019/0183040 | A1 | * | 6/2019 | Simmons ........... A01D 34/4161 |
| 2020/0120865 | A1 | * | 4/2020 | Di Biase ............. A01D 75/185 |

FOREIGN PATENT DOCUMENTS

| | | | | |
|---|---|---|---|---|
| CN | 104186100 | | 2/2014 | |
| CN | 205961824 | | 2/2017 | |
| DE | 3736032 | A * | 5/1989 | ........... A01D 34/863 |
| DE | 9311854 | | 10/1993 | |
| DE | 4305135 | A1 * | 10/1994 | ........... A01D 34/863 |
| DE | 20211861 | | 11/2002 | |
| DE | 20211861 | U1 * | 11/2002 | ........... A01D 34/863 |
| DE | 10321683 | A1 * | 12/2004 | ........... A01D 34/863 |
| DE | 202005009008 | | 12/2005 | |
| DE | 202005009008 | U1 * | 1/2006 | ........... A01D 34/863 |
| DE | 102005035636 | | 2/2007 | |
| DE | 102005035636 | A1 * | 2/2007 | ........... A01D 34/863 |
| DE | 102009033706 | | 1/2011 | |
| DE | 102009033706 | A1 * | 1/2011 | ........... A01D 34/863 |
| DE | 102011100282 | | 10/2012 | |
| DE | 102011100282 | A1 * | 10/2012 | ............. A01D 34/64 |
| EP | 1527670 | | 5/2005 | |
| EP | 1527670 | A2 * | 5/2005 | ........... A01D 34/863 |
| EP | 1606987 | A1 * | 12/2005 | ........... A01D 34/863 |
| EP | 1847168 | A1 * | 10/2007 | ........... A01B 73/065 |
| EP | 2189054 | | 5/2010 | |
| EP | 2189054 | A1 * | 5/2010 | ........... A01D 34/863 |
| EP | 2210466 | | 7/2010 | |
| EP | 2878186 | | 6/2015 | |
| EP | 3360404 | A1 * | 8/2018 | ............. A01D 34/84 |
| FR | 2564279 | A * | 11/1985 | ........... A01D 34/863 |
| FR | 2942691 | A1 * | 9/2010 | ........... A01D 34/863 |
| FR | 2948850 | A1 * | 2/2011 | ........... A01D 34/863 |
| FR | 2996100 | A1 * | 4/2014 | ........... A01D 34/863 |
| FR | 3016493 | | 7/2015 | |
| FR | 3016493 | A1 * | 7/2015 | ........... A01D 34/733 |
| FR | 3044203 | A1 * | 6/2017 | |
| KR | 20150030991 | | 3/2015 | |
| WO | WO 1998006251 | | 2/1998 | |
| WO | WO-03007691 | A1 * | 1/2003 | ........... A01D 34/863 |
| WO | WO 2007052324 | | 5/2007 | |
| WO | WO-2007052324 | A1 * | 5/2007 | ........... A01D 34/863 |

OTHER PUBLICATIONS

CIPO; Notice of Allowance issued for Canadian Patent Application No. 3,039,189; Oct. 29, 2020.

* cited by examiner

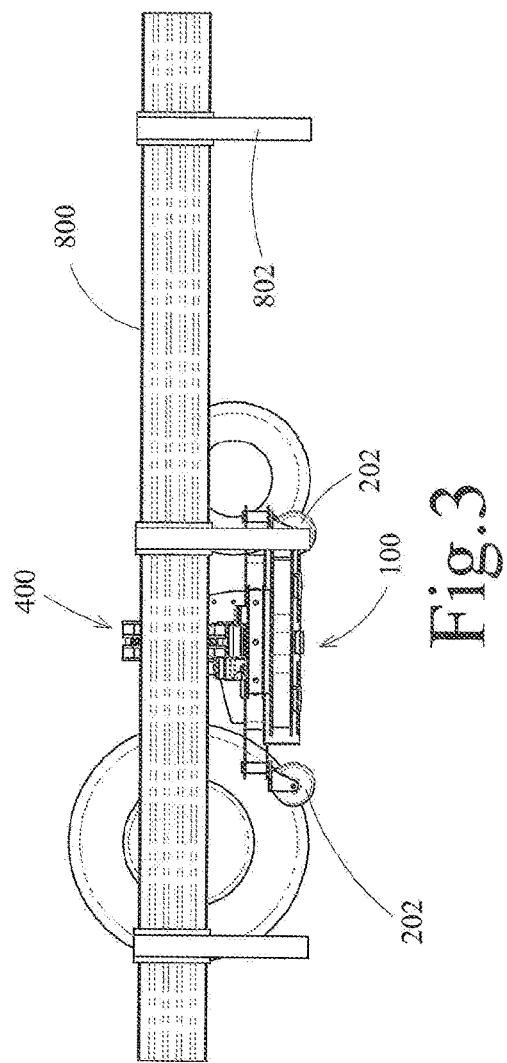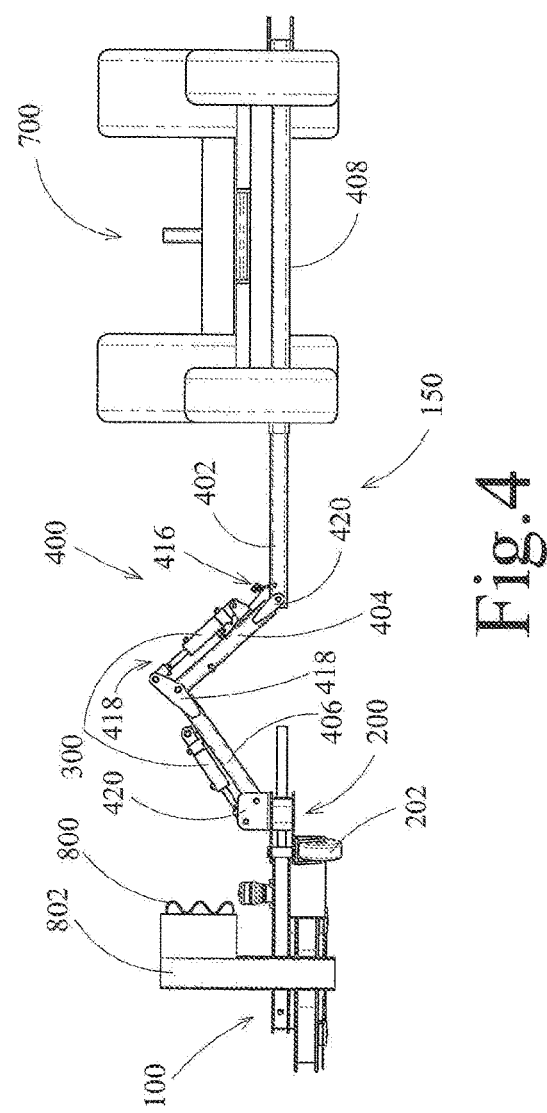

TURF TRIMMING SYSTEM AND INTEGRATED CONTROL SYSTEM

CROSS-REFERENCE TO RELATED APPLICATIONS

This application is a continuation-in-part of U.S. patent application Ser. No. 16/863,965, filed Apr. 30, 2020, which is a divisional of U.S. patent application Ser. No. 15/957,401, filed Apr. 19, 2018, herein incorporated by reference in their entirety.

FIELD OF THE DISCLOSURE

The disclosure relates generally to the field of turf trimming systems and controlling rotary trimming attachments. More particularly, the present subject matter relates to controlling a rotary trimming attachment assembly configured for trimming around stationary objects.

BACKGROUND OF THE DISCLOSURE

Agricultural attachments, such as rotary mowers, are used to cut vegetation and brush along highway areas and ditches. Typically, the mower includes a tractor and a rotary mower or cutter. The rotary mower is operationally connected to the tractor via power driven mechanism, such as a power take-off (PTO). The rotary mower is usually connected to the back of the tractor and is pulled behind the tractor. As the tractor moves forward, the rotary mower mows vegetation and brush.

Existing mowers and attachments for mowing along roadsides cannot sufficiently mow around stationary objects. For example, while a conventional flail mower can mow beneath guard rails and fences, a flail mower cannot mow around a post without requiring that the direction of travel of the mobile machine upon which the flail mower is mounted be changed so that the flail mower can be repositioned relative to the post. Even if such a mower is successfully moved around the post, the area adjacent the post must be mowed a second time using a handheld trimmer, or herbicides or other hazardous substances must be applied to the area adjacent the post to destroy any vegetation that the flail mower could not reach.

Traditional weed cutters must be manually guided around corners and obstacles. Using a vehicle and mower to cut weeds around objects like fence posts, for example, can therefore be a challenge. And, cutting weeds around fence posts with a hand-held weed cutter is quite labor intensive.

Many control variables are encountered when operating a motorized trimming system used to trim vegetation on roadways, fence lines, around objects, with varying conditions in a continuous motion from within the safety of a carrier vehicle, tractor, utility vehicle, or truck. When properly controlled, the attachments greatly reduces or eliminates the need for roadside trimming crews, adding to the overall speed, efficiency and safety of trimming operations. Previous devices have relied on the operator or mechanical devices to achieve rotation and proximity to the object being trimmed. Multiple integrated sensors and electronic controllers are needed to optimize and control the trimming process.

BRIEF DESCRIPTION OF THE DISCLOSURE

Aspects and advantages of the disclosure will be set forth in part in the following description, or may be obvious from the description, or may be learned through practice of the disclosure.

A trimming system is disclosed for trimming around stationary objects, using a carrier vehicle, a rotary trimming attachment extending from the carrier vehicle, and an integrated control system for the carrier vehicle and the rotary trimming attachment. The rotary trimming attachment can further have a cutting head assembly slidably coupled to a carrier assembly. The cutting head assembly can have at least two counter-rotating blades, at least one rotator motor configured to rotate the cutting head assembly about a cutting head central axis, at least one blade drive motor configured to drive the at least two counter-rotating blades, and at least one lateral actuator configured to move the cutting head assembly position relative to the carrier assembly. An integrated control system for the carrier vehicle and the rotary trimming attachment can have at least one controller further having a non-transitory computer-readable storage medium configured with instructions executable by one or more processors to cause the one or more processors to receive input from a plurality of sensors and actuators and transmit conditioned control signals to the carrier vehicle and rotary trimming attachment while trimming around stationary objects.

A method for controlling a trimming system for trimming around stationary objects is also disclosed. The method can have a manual mode and an auto mode. The manual mode in the trimmer integrated control system can have a controller perform the following steps: moving a trimming system comprising a carrier vehicle, a rotary trimming attachment, and the trimmer integrated control system into initial position such that the carrier vehicle travel path is parallel to a target stationary object centerline; placing the rotary trimming attachment carrier assembly casters in contact with the ground; selecting a target stationary object preset to establish trimming parameters comprising at least one of circle of avoidance (COA) and cutting head path; placing the trimmer integrated control system in engage target mode; and manually engaging the target stationary object with a cutting head assembly of the rotary trimming attachment. The auto mode can have the controller perform the following steps: activating auto control in the controller, with manual override, to set a plurality of alignment preset parameters to zero and move the carrier vehicle in a forward direction parallel to the target centerline, while the controller maintains a preset slope and a centerline zero alignment; energizing cutting head assembly drive motor; initiating controller trimming sequence when the cutting head assembly reaches a preset distance to the target stationary object as determined by at least one proximity sensor and defined by the circle of avoidance; continuing controller trimming sequence, as the carrier vehicle travels, to start the cutting head assembly rotation using a rotator motor and retraction of the cutting head assembly; providing additional cutting head assembly lateral motion, if needed, using controller commands to first a reach cylinder and then a boom cylinder; maintaining the circle of avoidance, with manual override, until a forward or reverse carrier vehicle distance of travel (CDT) equals the approximate radius of the cutting head path; returning the alignment preset parameters to zero when the cutting head assembly rotation equals 180 degrees and CDT equals the diameter of the COA; and seeking a new target stationary object or cancelling trimming operations.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which:

FIG. 3 illustrates a side view of one embodiment of the rotary trimming attachment, carried by a vehicle, as it mows near a guard rail.

FIG. 4 illustrates a front view of one embodiment of the rotary trimming attachment, carried by a vehicle, as it mows near a guard rail.

Figure 1:
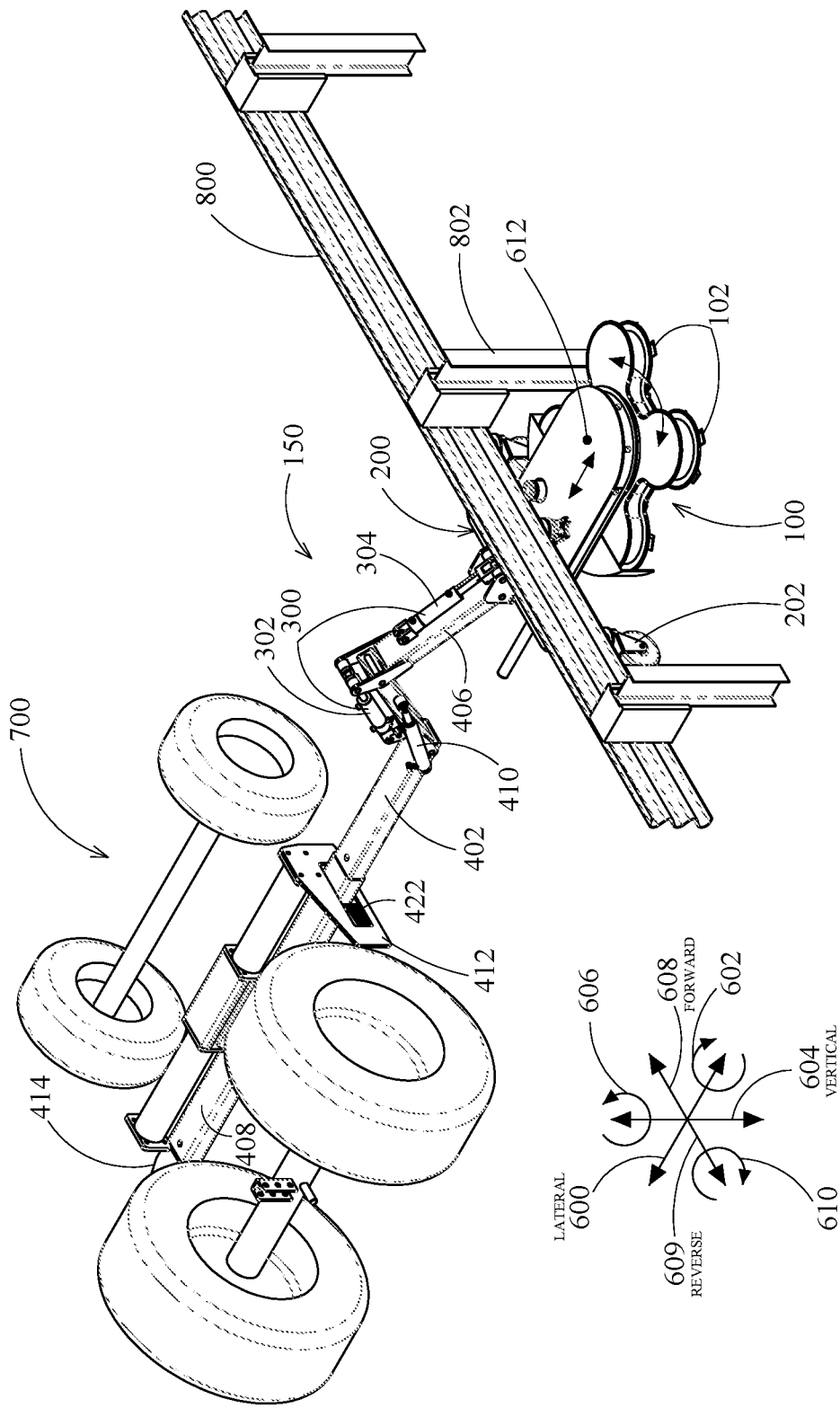
FIG. 1 illustrates an isometric view of one embodiment of the rotary trimming attachment, carried by a vehicle, as it mows near a guard rail.

Repeat use of reference characters in the present specification and drawings is intended to represent the same or analogous features or elements of the present disclosure.

DETAILED DESCRIPTION OF THE DISCLOSURE

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Each example is provided by way of explanation of the disclosure, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

The term "proximate" indicates a position on an element that is closest to the vehicle, whereas the term "distal" indicates a position on an element that is furthest away from the vehicle. Dual-headed arrows shown on the figures indicates the ability of a referenced element to change position in a direction generally parallel with the direction of the arrow.

As shown in the figures, the turf trimmer rotary trimming attachment 150 overcomes many problems associated with available mowers by providing a cutting head assembly 100 featuring multiple rotating blades 102 and a counter-rotating blade 104. The cutting head assembly 100 can be slope-controlled and able to rotate relative to a cutting head central axis 612 in response to approaching a stationary object 802 to be trimmed around. The turf trimmer rotary trimming attachment 150 provides a cutting head assembly 100 with a unique "cloverleaf" shape that rotates around stationary objects 802, cutting weeds and grass from around all grade-level surfaces of the stationary objects 802 while traveling along with a vehicle 700. The rotary trimming attachment 150 can rotate around stationary objects 802 in a controlled pattern which results in a complete mowing and trimming around all grade-level surfaces of a stationary object thereby leaving no area of vegetation un-mowed. The mowing pattern is precisely controlled such that supplemental trimming and/or the use of herbicides or other harmful chemicals to remove un-mowed vegetation is eliminated or substantially reduced. The turf trimmer rotary trimming attachment 150 also eliminates or reduces the costs and hazards associated with applying herbicides or trimming by hand, and increases the speed and efficiency of the mowing process.

The turf trimmer rotary trimming attachment 150 can be used to trim vegetation on roadways, fence lines, pond banks, and around objects with varying ground surface conditions, in a continuous motion from within the safety of a carrier vehicle 700, tractor, utility vehicle, or truck. The rotary trimming attachment 150 greatly reduces, or eliminates the need for roadside trimming crews, adding to the overall speed, efficiency and safety of trimming operations. Previous devices have relied on the operator or mechanical devices to achieve rotation and proximity to the object being trimmed. The rotary trimming attachment 150 employs multiple integrated sensors and electronic controllers to optimize the trimming process.

The turf trimmer rotary trimming attachment 150 can adjust automatically to varying conditions including slope, spacing of objects and distance from roadway. The rotary trimming attachment 150 can use an extending boom 402, a reach boom 404, a float boom 406, and a free floating cutting head assembly 100 supported on a carrier assembly 200 by two or more height adjustable casters 202. The cutting head assembly 100 can adjust its lateral distance from the carrier assembly 200 using a lateral actuator 106 (see FIG. 12). A slope adjusting assembly 300 can use hydraulic cylinders or electric linear actuators controlled by the operator and held on slope by an integrated slope sensor and cylinder. The rotational cutting head assembly 100 can be rotated by a hydraulic rotator motor 108 or electric servo motor capable of input and varying torque to keep objects engaged while trimming. A smart electric servo actuator or smart hydraulic cylinder can move the cutting head assembly 100 in and out to keep the cutting head assembly 100 engaged during the rotating process. The cutting head assembly 100 can first be moved relative to the carrier assembly 200 with adjustments by the lateral actuator 106 (see FIG. 12), then the reach boom 404, then finally the extending boom 402. A hydraulic blade drive motor 110 can power a plurality of rotating cutting blades 102 and at least one counter rotating center blade 104 with pressure sensor(s) that can turn off the drive motor 110 in case of entanglement with roadway or other debris. The design of the cutting blades 102 can lessen the possibility of entanglement and damage when in contact with unknown objects. The rotary trimming attachment 150 can use multiple sensors, ultrasonic, mechanical, and or proximity to ensure optimum placement of the cutting head assembly 100 in relation to the stationary object being trimmed. A slope control circuit 500 with a controller 504 can also control the cutting head assembly 100 rotation and the complex movement around the stationary object. The rotary trimming attachment 150 low profile can allow it to reach under low hanging obstructions such as guard rails 800 or tree limbs. The free-floating cutting head assembly 100 can provide uniform cutting height without constant monitoring and adjustments by the operator. The boom assembly 400 can be protected by a breakaway hydraulic cylinder or springs as a biasing element 422 that allows the boom assembly 400 to move in the opposite direction of travel 1038, avoiding damage in case of operator error.

Figure 2:
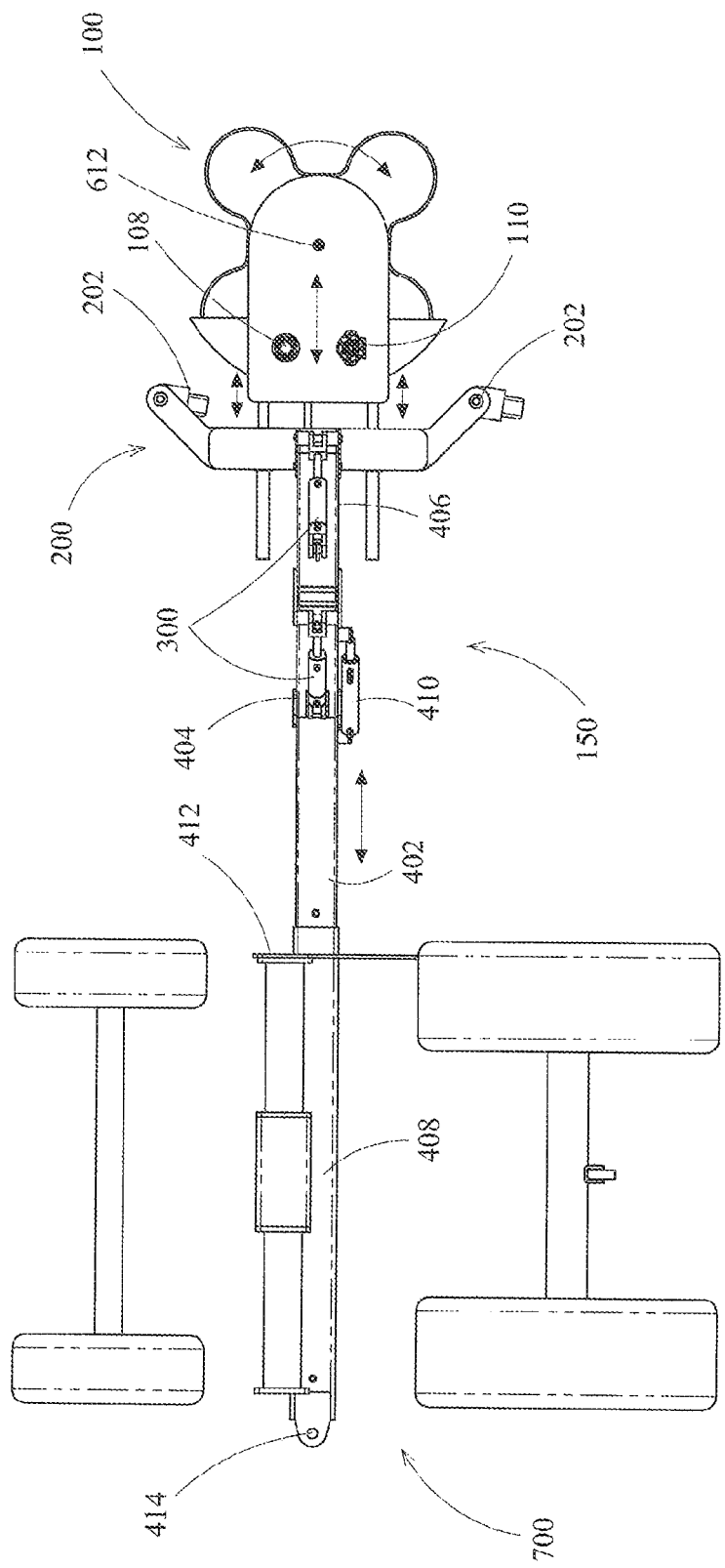
FIG. 2 illustrates a plan view of an embodiment of the rotary trimming attachment showing major components.
Figure 6:
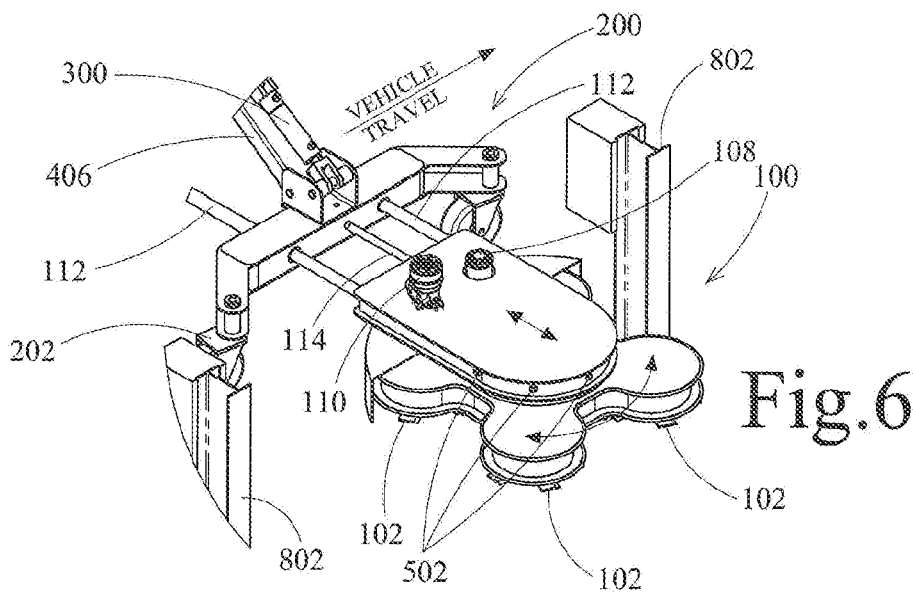
FIGS. 6-8 illustrate a cutting sequence of a rotary trimming attachment as it trims around a stationary object.
Figure 7:
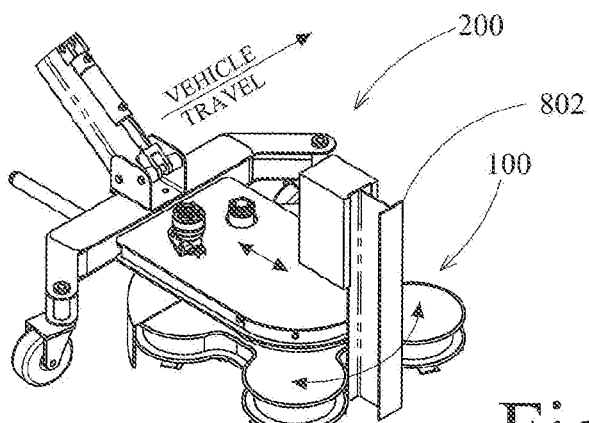
Figure 8:
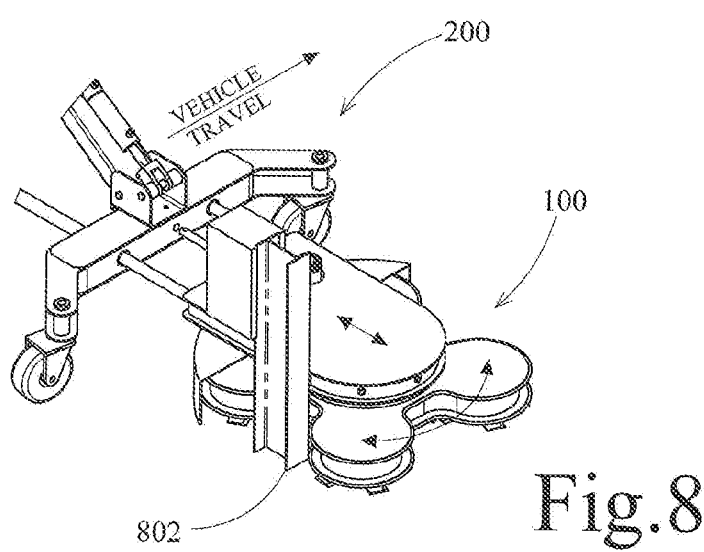
Figure 9:
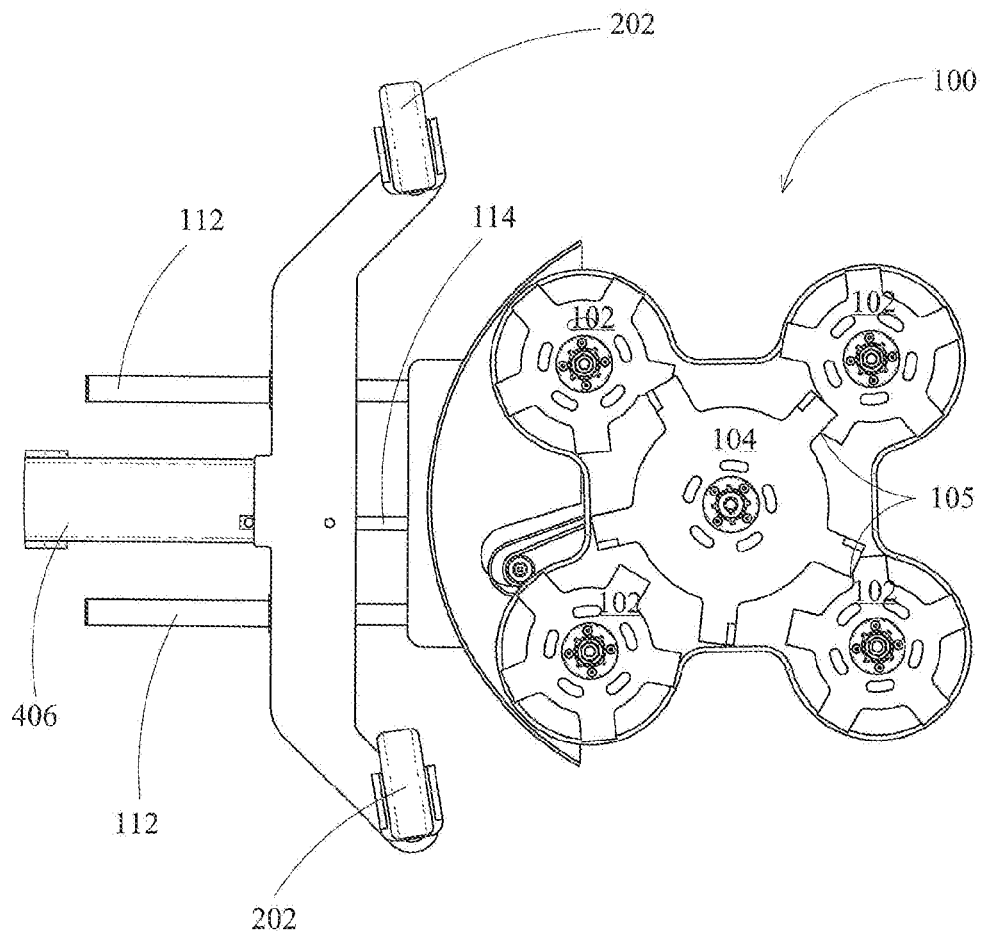
FIG. 9 illustrates a bottom view of the cutting head assembly and carrier assembly.
Figure 11:
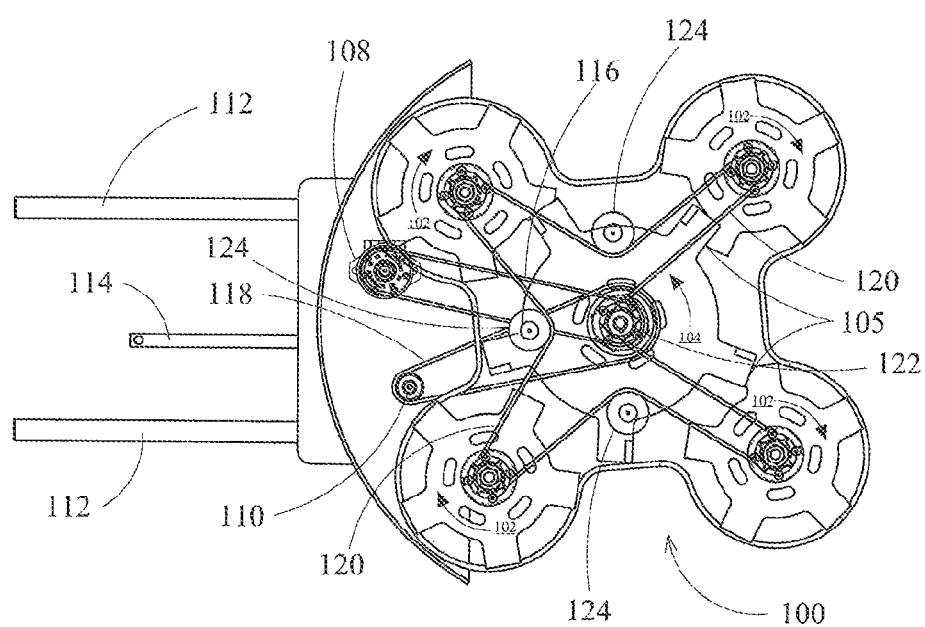
FIG. 11 illustrates a bottom view of the cutting head assembly and belt routing.
Figure 12:
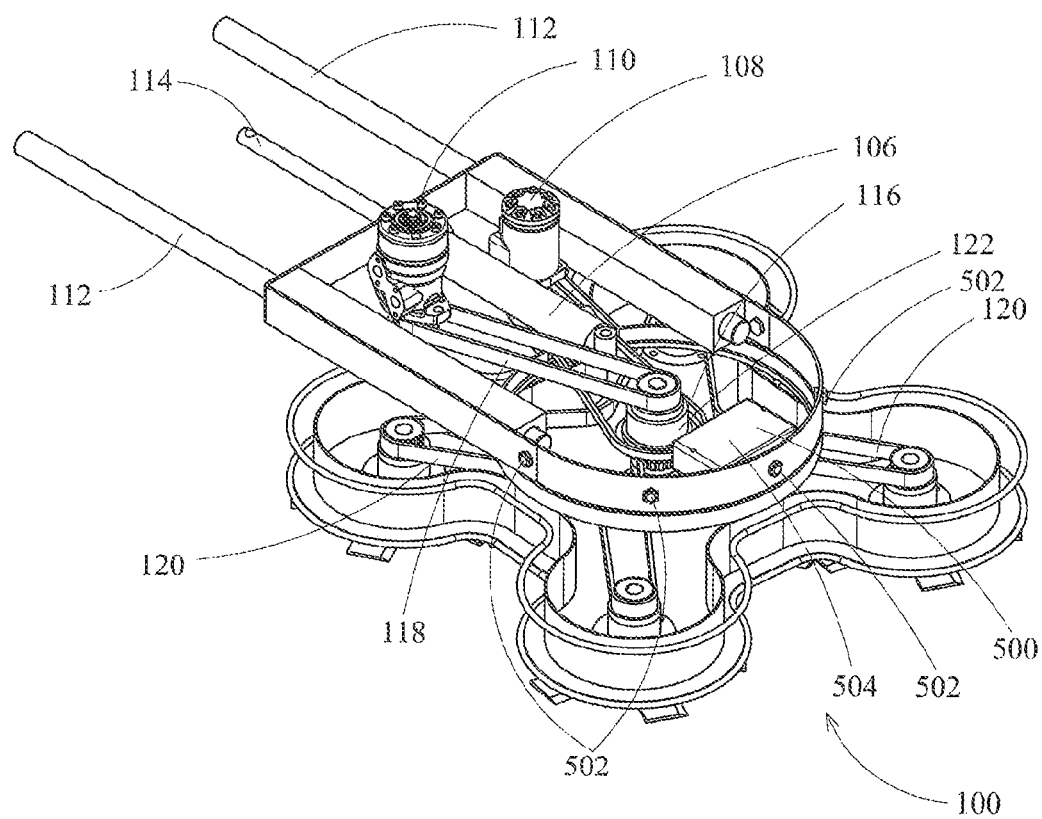
FIG. 12 illustrates an isometric view of internal components of the cutting head assembly.

Referring now to the drawings, wherein like numerals refer to like components, the directional legend shown in FIG. 1 establishes directional references for operational motion of the turf trimmer rotary trimming attachment 150: lateral 600, lateral rotation 602, vertical 604, vertical rotation 606, forward 608, reverse 609, travel rotation 610, and cutting head central axis 612. One embodiment of the rotary trimming attachment 150 is shown in FIGS. 1-3 as having a cutting head assembly 100 that is slidably coupled to a carrier assembly 200. The cutting head assembly 100 can have at least two counter-rotating blades, for example four perimeter clockwise rotating blades 102 and a central counter-clockwise rotating blade 104 as shown in FIGS. 7 and 9. At least one rotator motor 108 can be configured to rotate the cutting head assembly 100 about a cutting head central axis 612. At least one blade drive motor 110 can be configured to drive the at least two counter-rotating blades 102, 104. Both the rotator motor 108 and blade drive motor 110 can be mounted off-center of the cutting head assembly 100 to maximize vertical clearance of the cutting head assembly 100 while cutting underneath objects. Both the rotator motor(s) 108 and the blade drive motor(s) 110 can be direct drive or belt drive. FIGS. 11-12 illustrates a belt drive arrangement wherein a drive motor belt 118 drives the central spindle 122. The central spindle 122 drives the counter-rotating blades 102, 104, via the blades belt 120, which is routed to rotate the four perimeter blades 102 and the central counter-rotating blade 104 in opposite directions. The rotator motor 108 can rotate the cutting head assembly 100 using a rotator belt 116. At least one lateral actuator 106 can be configured to move the cutting head assembly 100 position relative to the carrier assembly 200. As seen in FIGS. 6-8, the lateral actuator 106, which can be a high-speed servo screw motor, moves the cutting head assembly 100 laterally away and towards the carrier assembly 200 for proper alignment with a stationary object, such as a guard rail post 802. The "cloverleaf" arrangement of the rotating blades 102 enables the cutting head assembly 100 to trim the back vertical surface of the guard rail post 802 as well as the front vertical surface and the lateral vertical surfaces, as the cutting head assembly 100 rotates during forward 608 and or reverse 609 movement.

As seen in FIG. 4, the rotary trimming attachment 150 can have a boom assembly 400 having multiple sections such as an extending boom 402 that can be adjustably extended from a mount 408. Also, a reach boom 404 can be rotatably coupled to the extending boom 402 at the reach boom proximate end 416 and rotatably coupled to a float boom 406 at an opposing reach boom distal end 418. The float boom 406 can be rotatably coupled to the carrier assembly 200 at a float boom distal end 420. The mount 408 can be removably coupled to a vehicle 700, such as a carrier vehicle, tractor, utility vehicle, or truck.

Figure 5:
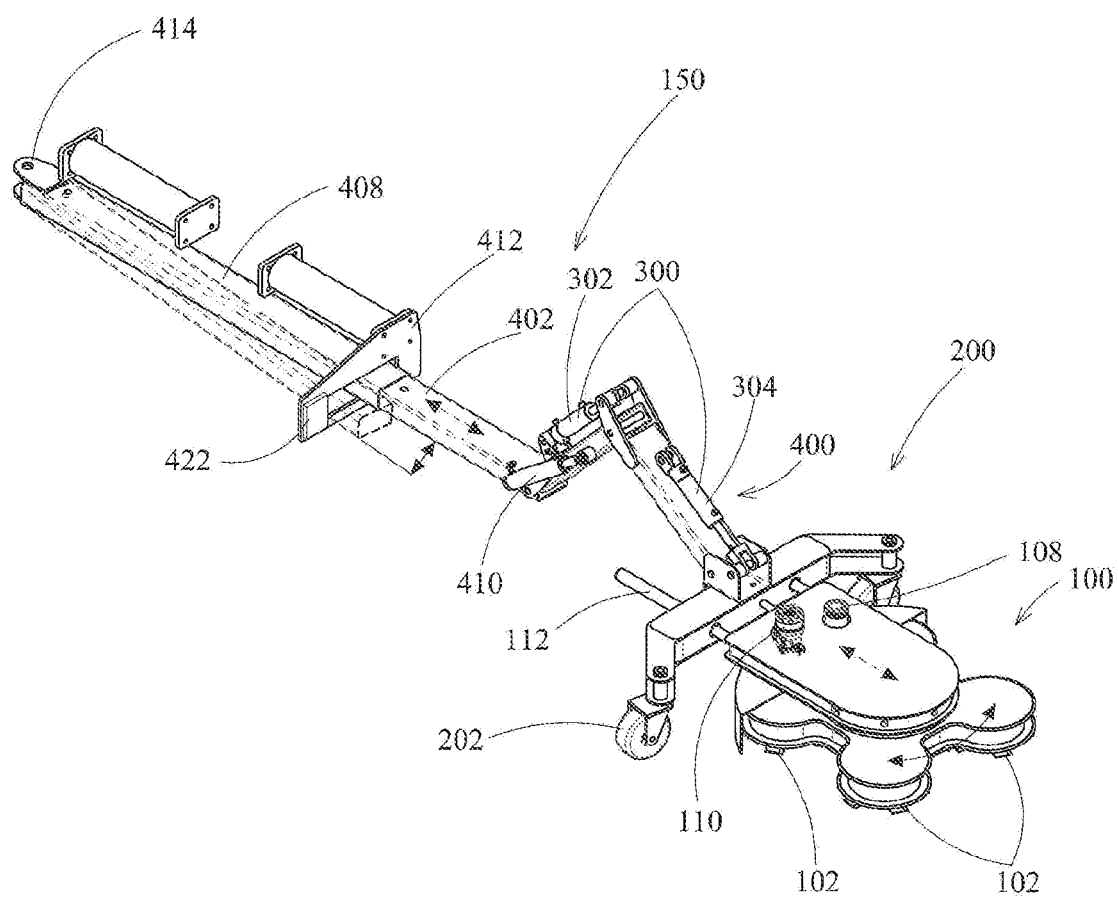
FIG. 5 illustrates an isometric view of one embodiment of the rotary trimming attachment, carried by a vehicle, as it pivots upon undesired strike.

As seen in FIG. 5, the rotary trimming attachment 150 boom assembly 400 can have a boom pivot flange 414 and a boom pivot retainer plate 412 configured to pivot the mount 408, and thereby the entire boom assembly 400, around the boom pivot flange 414 on one end of the mount 408, while the mount 408 slides within an aperture of the boom pivot retainer plate 412 on the opposing end of the mount 408. A biasing element 422, such as a spring or bellows, can be coupled to the boom pivot retainer plate 412 such that the boom assembly 400 is retained in a forward position until an undesired strike of the boom assembly 400 causes reverse movement. The pivoting motion reduces the risk of damaging the boom assembly 400 from an undesired strike.

FIGS. 6-8 illustrate a cutting sequence of a rotary trimming attachment 150 as it trims around a stationary object 802. The rotary trimming attachment 150 carrier assembly 200 can have two or more adjustable casters 202 to support the carrier assembly 200 and the coupled cutting head assembly 100 from the ground during operation, primarily when the cutting head assembly 100 is in float mode. The casters 202 can rotate 360 degrees to enable motion in any direction and the height of the casters 202 can be adjusted for proper positioning of the cutting head assembly 100. A slope adjusting assembly 300 can be removably coupled to the boom assembly 400 to adjust the position of the cutting head assembly 100. The coupling of the carrier assembly 200 to the boom assembly 400 permits the carrier assembly 200 to rotate around the forward/reverse travel axis while the lateral position of the cutting head assembly 100 is adjusted by the lateral actuator 106.

Figure 10:
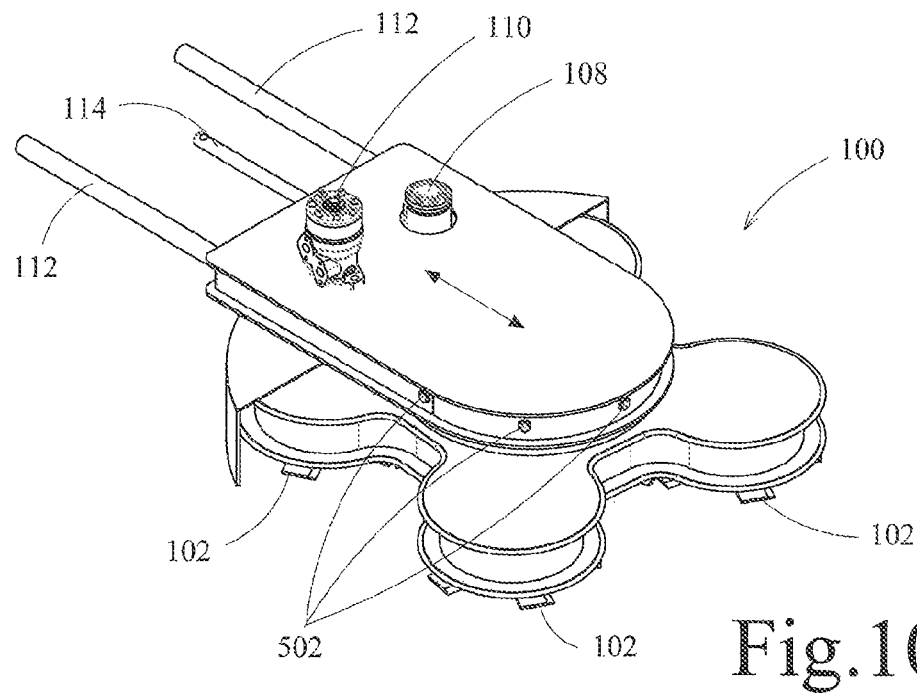
FIG. 10 illustrates an isometric view of the cutting head assembly.

As seen in FIGS. 9-11, at least two slide guides 112 stabilize the cutting head assembly 100 during lateral position adjustment. A lateral motion shaft 114, such as a screw from a high-speed servo screw motor 106, extends from the lateral actuator 106 for lateral position adjustment of the cutting head assembly 100. The rotating blade(s) 102 and the counter-rotating blade 104 can at least partially overlap 105 at the cutting edges of each of the blades to permit bi-directional cutting of vegetation and provide a cleaner cut. The overlap 105 vertical distance between the blades can be adjusted when each blade is installed on the cutting head assembly 100 to prevent contact of the blade cutting edges during operation. Also, the counter-clockwise rotating blade 104 and the rotating blades 102 can be configured in a 'stump jumper' arrangement (not shown in figures), as typical for many rotary cutters, wherein the blade has a plate or dish-shaped central portion with cutting portion of the blade mounted on the outer perimeter edge of the central portion. The outer perimeter edge is vertically offset from the rotating plane of the central portion of the blade thereby allowing the cutting head assembly 100 to skid over and jump any stump or high spot encountered. This prevents the cutting portion of the blades from striking the stump or high spot. This blade arrangement is similar to that used in drum mowers with central rotating drums and skids, the drum mower arrangement being an additional embodiment of the blades disclosed herein.

FIG. 11 illustrates a bottom view of the cutting head assembly 100 with belt routing that enables counter-rotating blades using a single blades belt 120. The drive motor belt 116 drives the central spindle 122 that is engaged with the blades belt, likely through at least one adjustable idler pulley 124. The rotator belt 116 engages with the central spindle 122 to rotate the cutting head assembly 100 about the cutting head central axis 612 in response to control commands from at least one of an operator, the slope adjusting assembly 300, the slope control circuit 500, and the controller 504.

The slope adjusting assembly 300 can have at least one float/lift cylinder 302, at least one slope cylinder 304 and at least one reach cylinder 410. The slope adjusting float/lift cylinders 302, 304, 410 can be driven by hydraulic pressure, electricity, pneumatic pressure, or combinations thereof. Hydraulic pumps, batteries, electric generators, air compressors and other devices that serve the rotary trimming attachment 150 can be tapped from the vehicle or separately self-contained in portable units.

Figure 15:
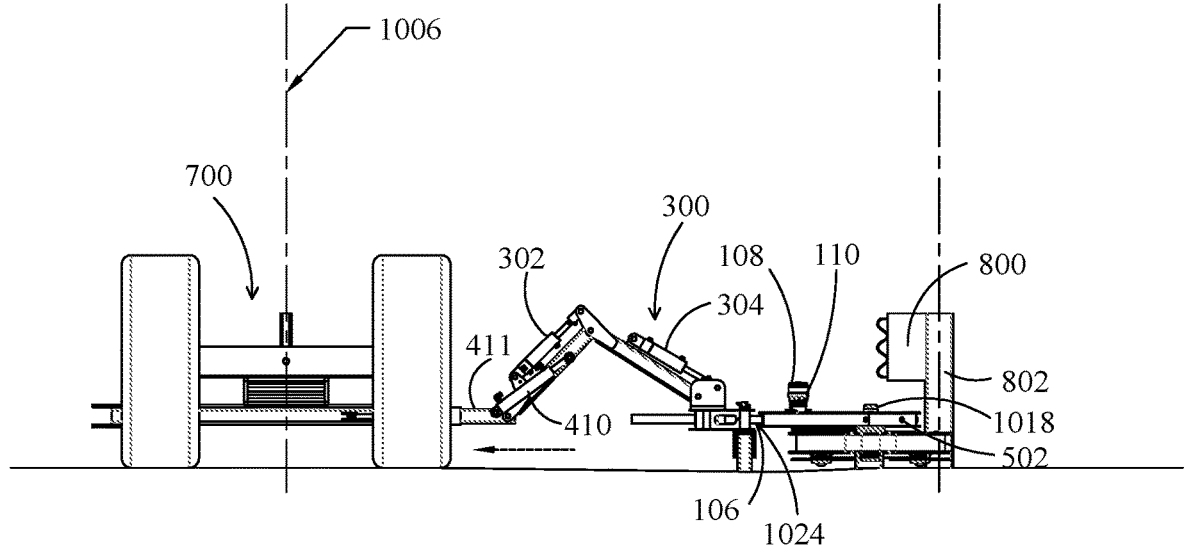
FIGS. 15/16 are a rear and top view of a trimming system showing midpoint engagement position with a target stationary object.
Figure 18:
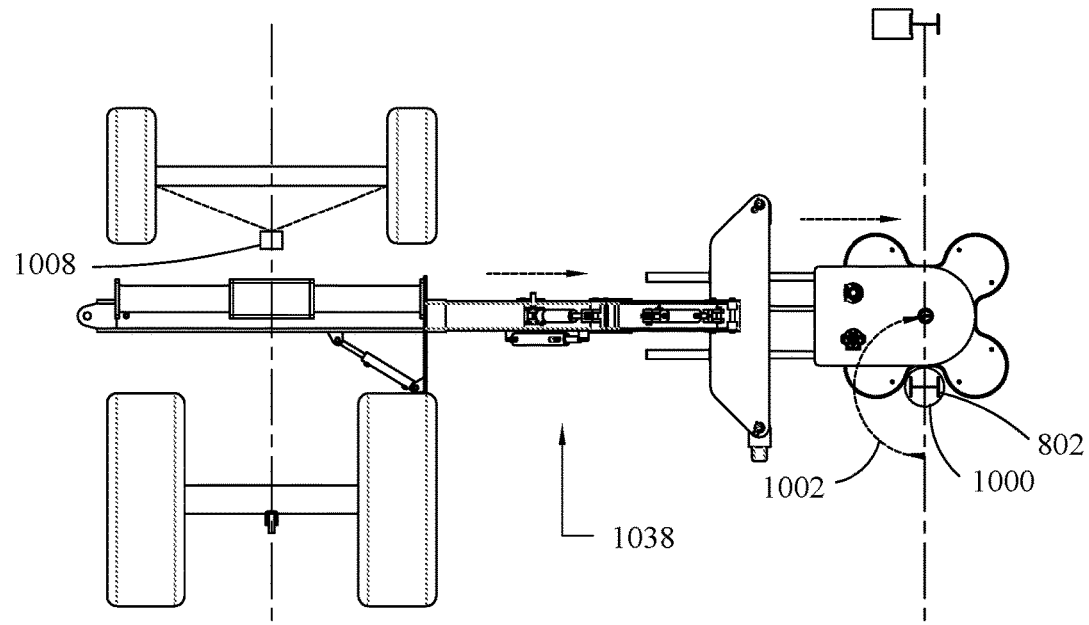
Figure 17:
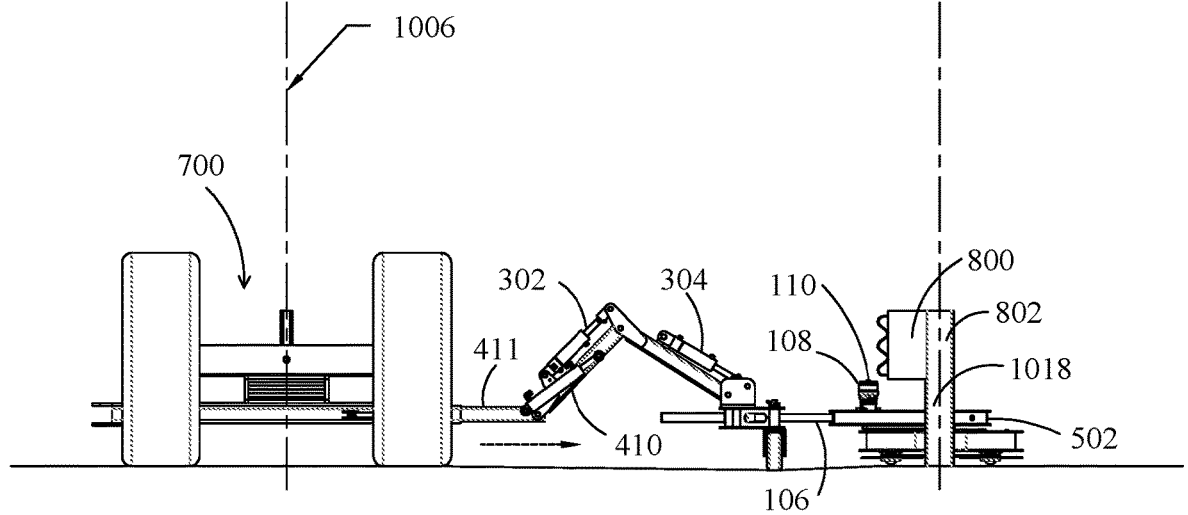
FIGS. 17/18 are a rear and top view of a trimming system showing final engagement position with a target stationary object.
Figure 20:
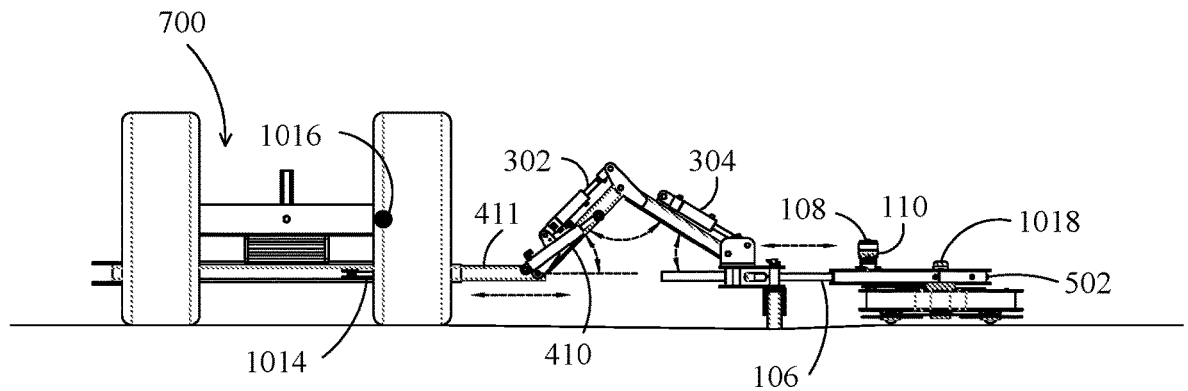
FIG. 20 is a rear view of a trimming system using an odometer for carrier vehicle auto steer.
Figure 19:
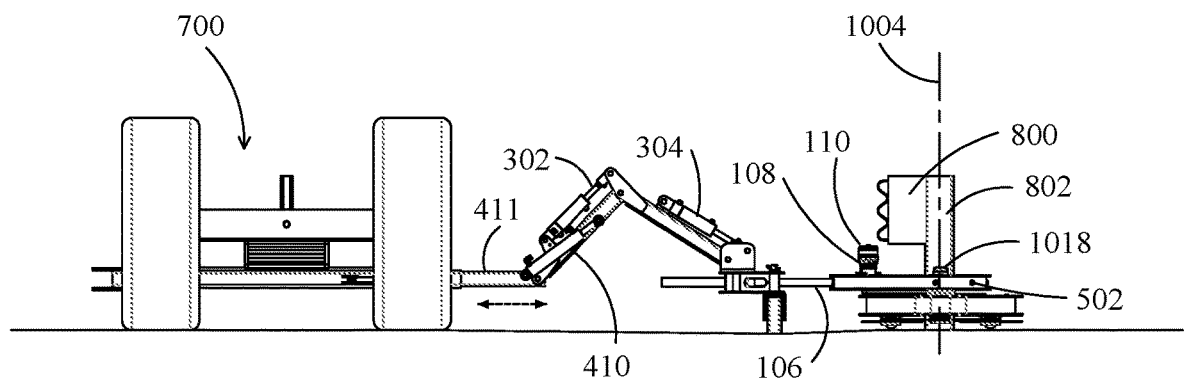
FIG. 19 is a rear view of a trimming system using carrier vehicle auto steer, positioned for engagement with a target stationary object
Figure 22:
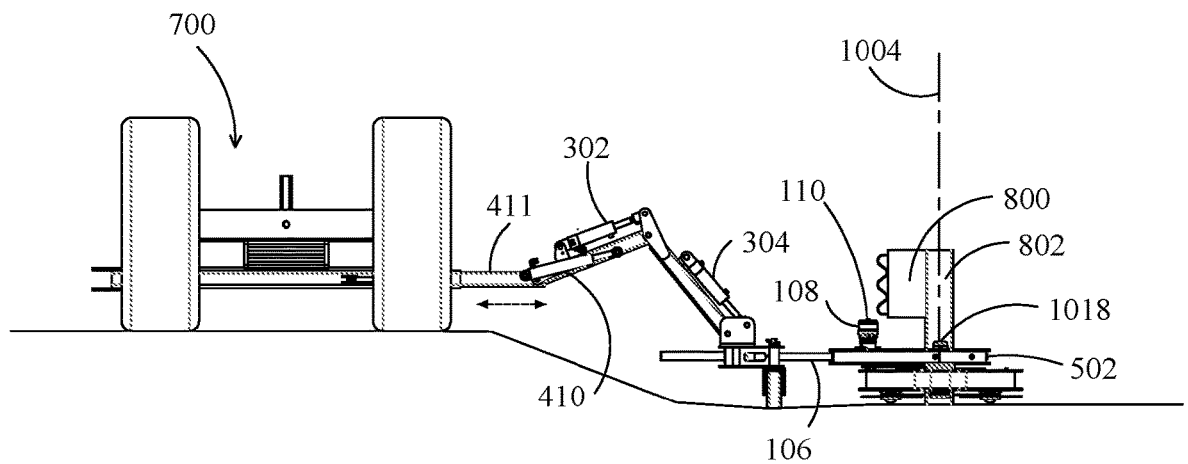
FIG. 22 is a rear view of a trimming system cutting on an lowered elevation and positioned for engagement with a target stationary object.
Figure 21:
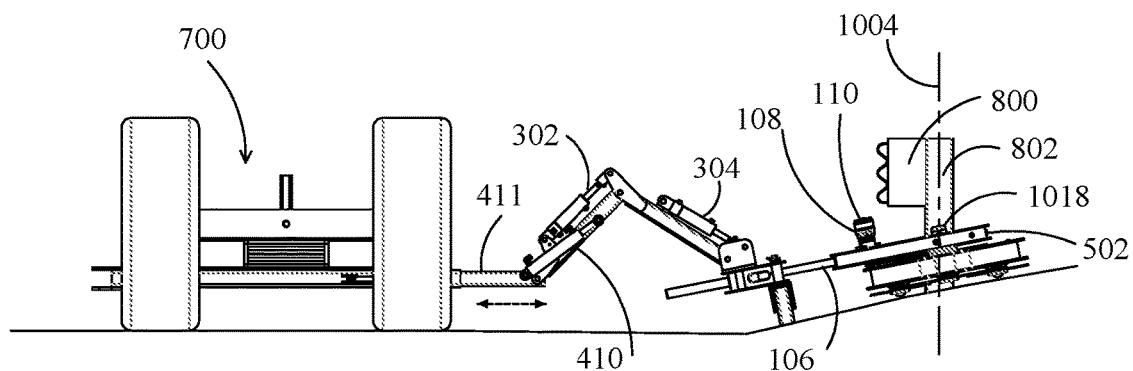
FIG. 21 is a rear view of a trimming system cutting on an upslope and positioned for engagement with a target stationary object.
Figure 23:
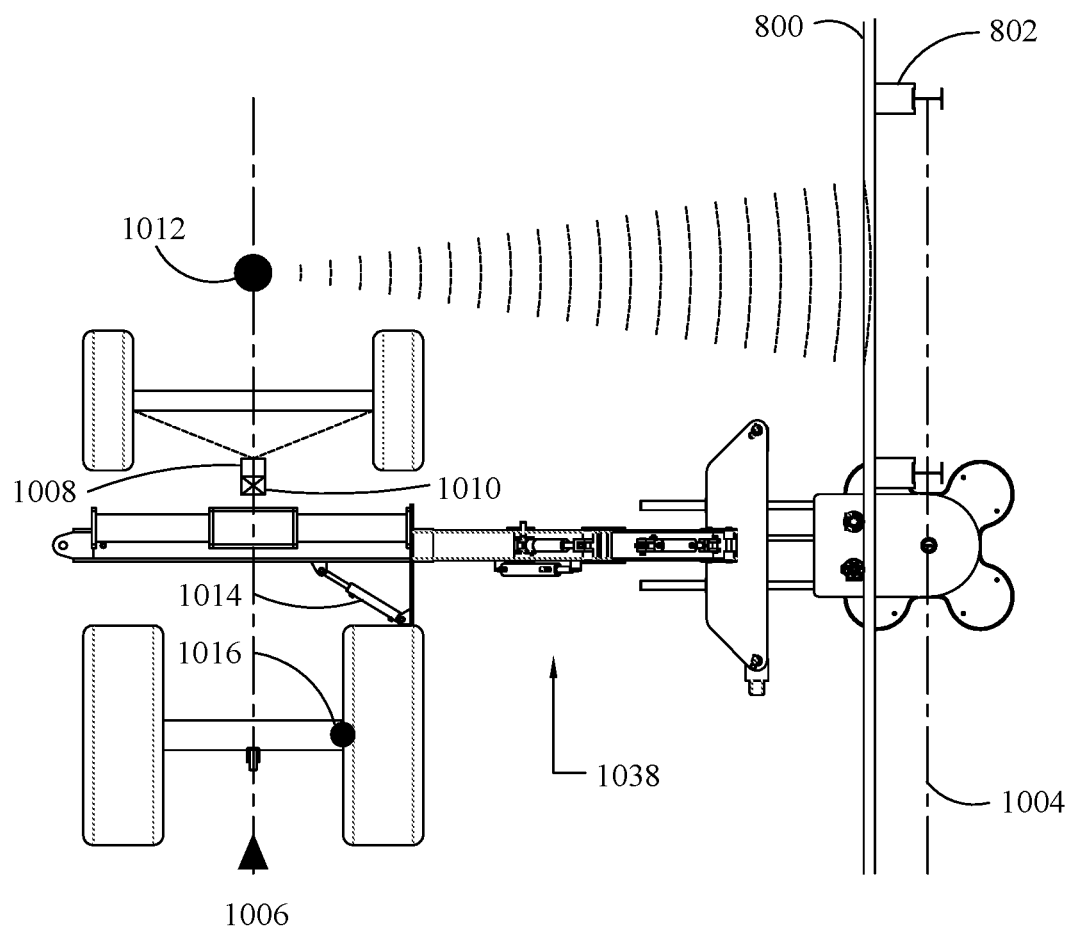
FIG. 23 is a top view of a trimming system using GPS for carrier vehicle auto steer, positioned for engagement with a target stationary object.
Figure 24:
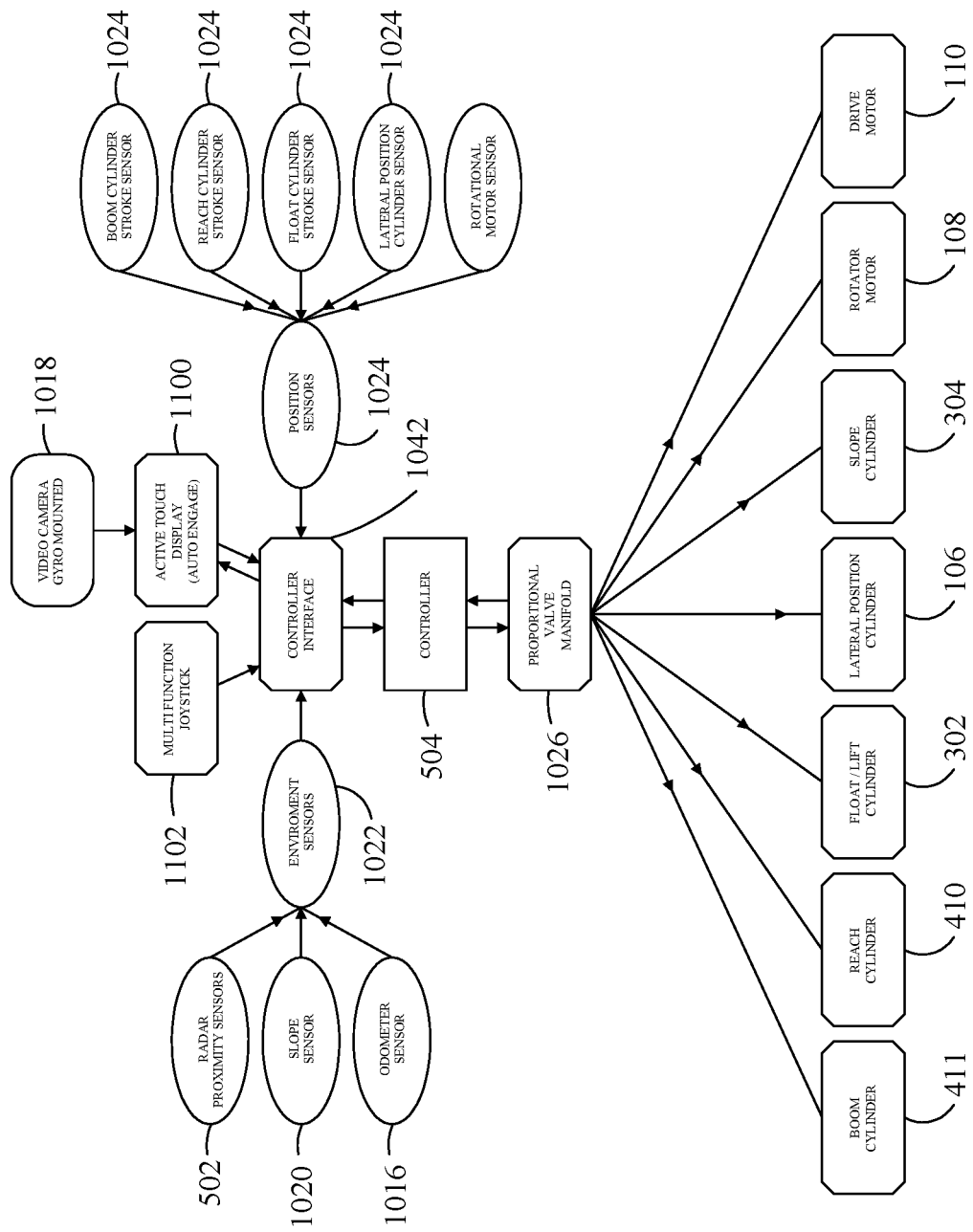
FIG. 24 is a flow diagram showing typical hardware items for integrated control of a trimming system with auto engage and auto steer.
Figure 25:
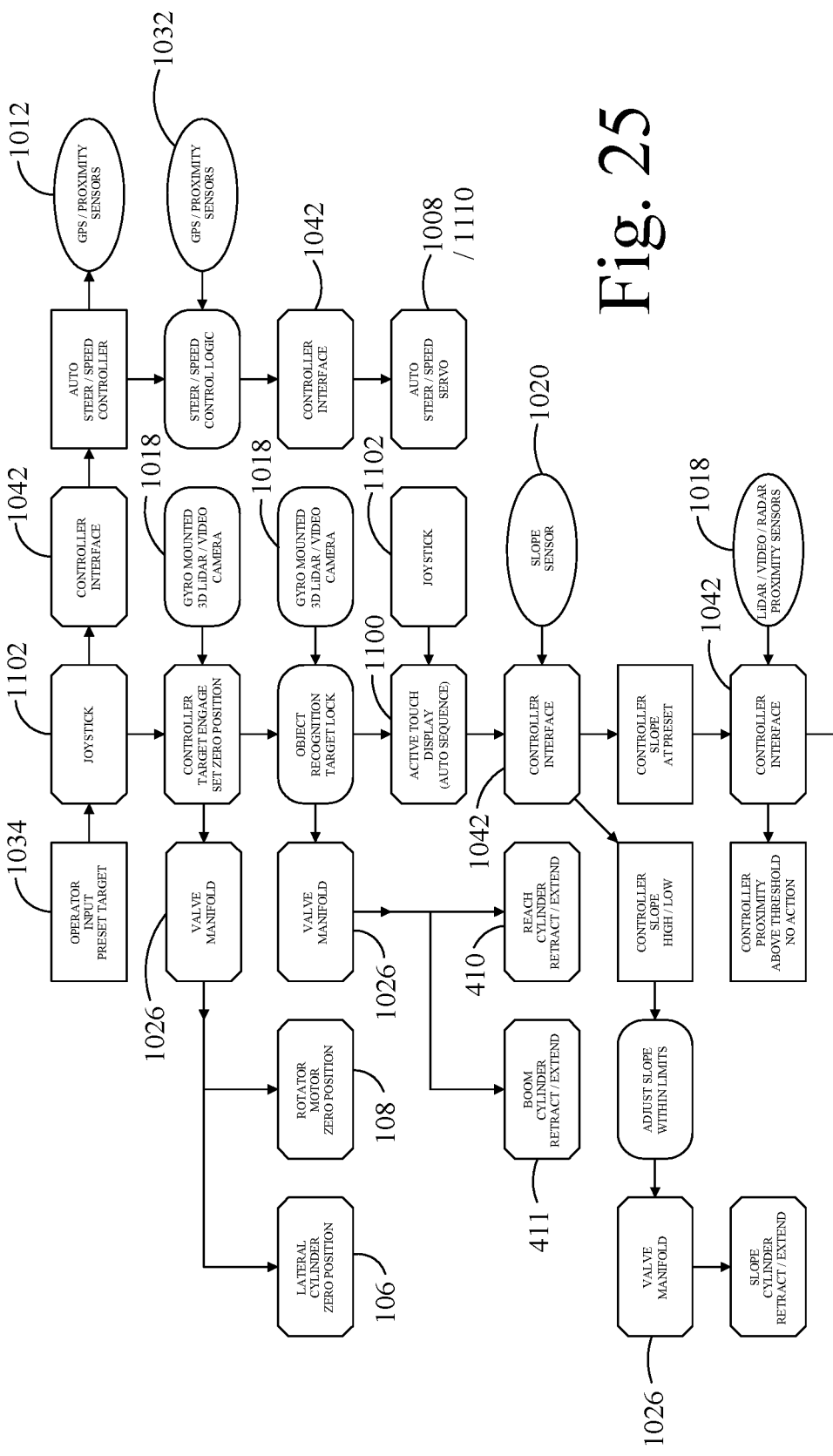
FIGS. 25/26 are flow diagrams for typical integrated control logic in a trimming system with auto engage and auto steer.
Figure 26:
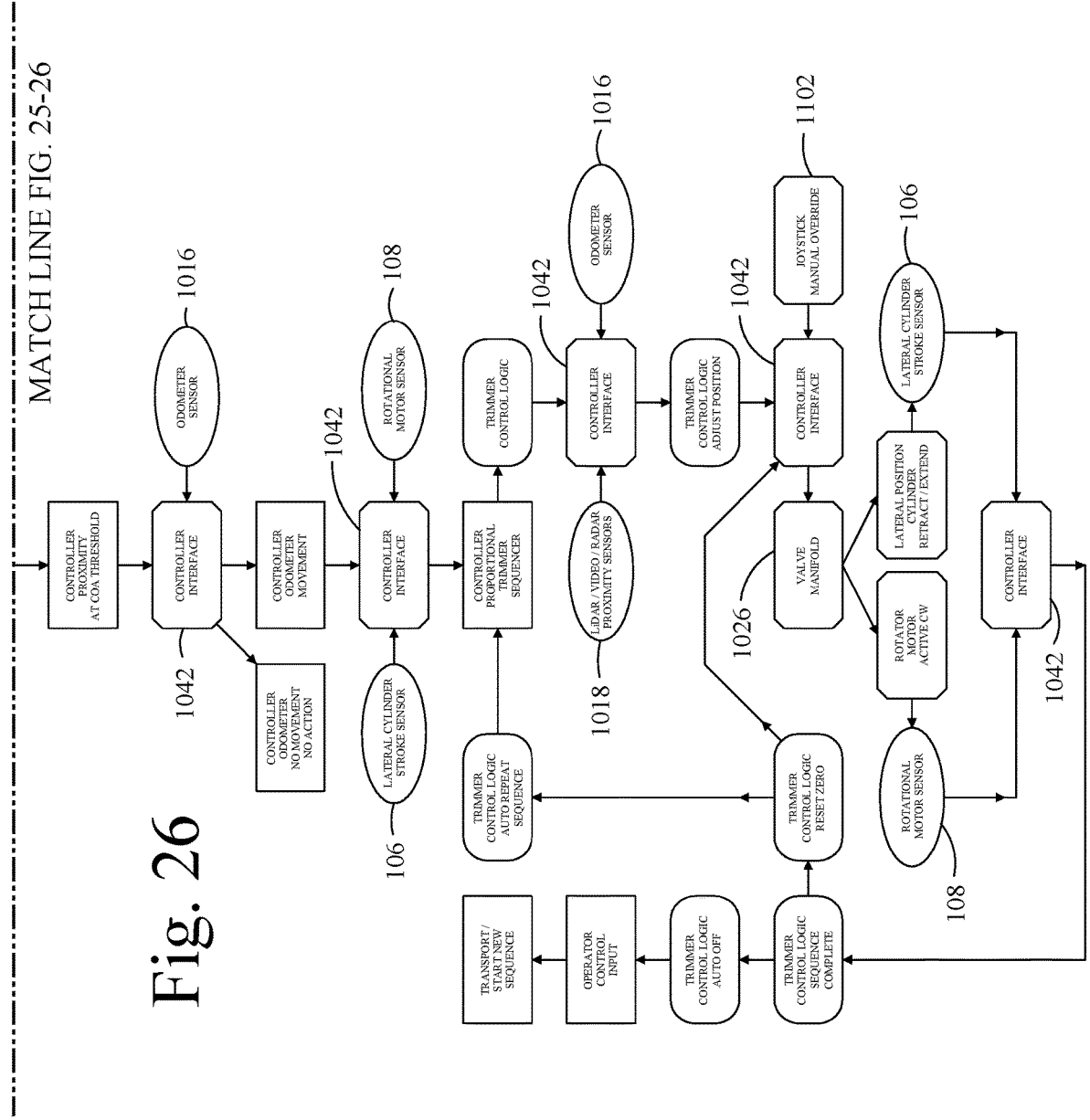
Figure 27:
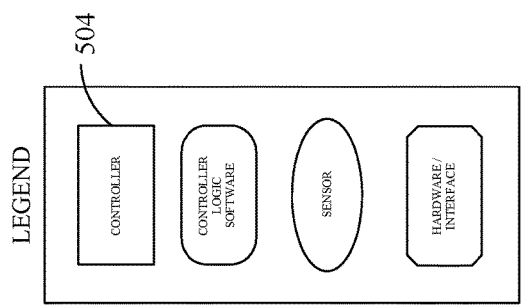
FIG. 27 is a legend for symbols used in the flow diagrams.
Figure 28:
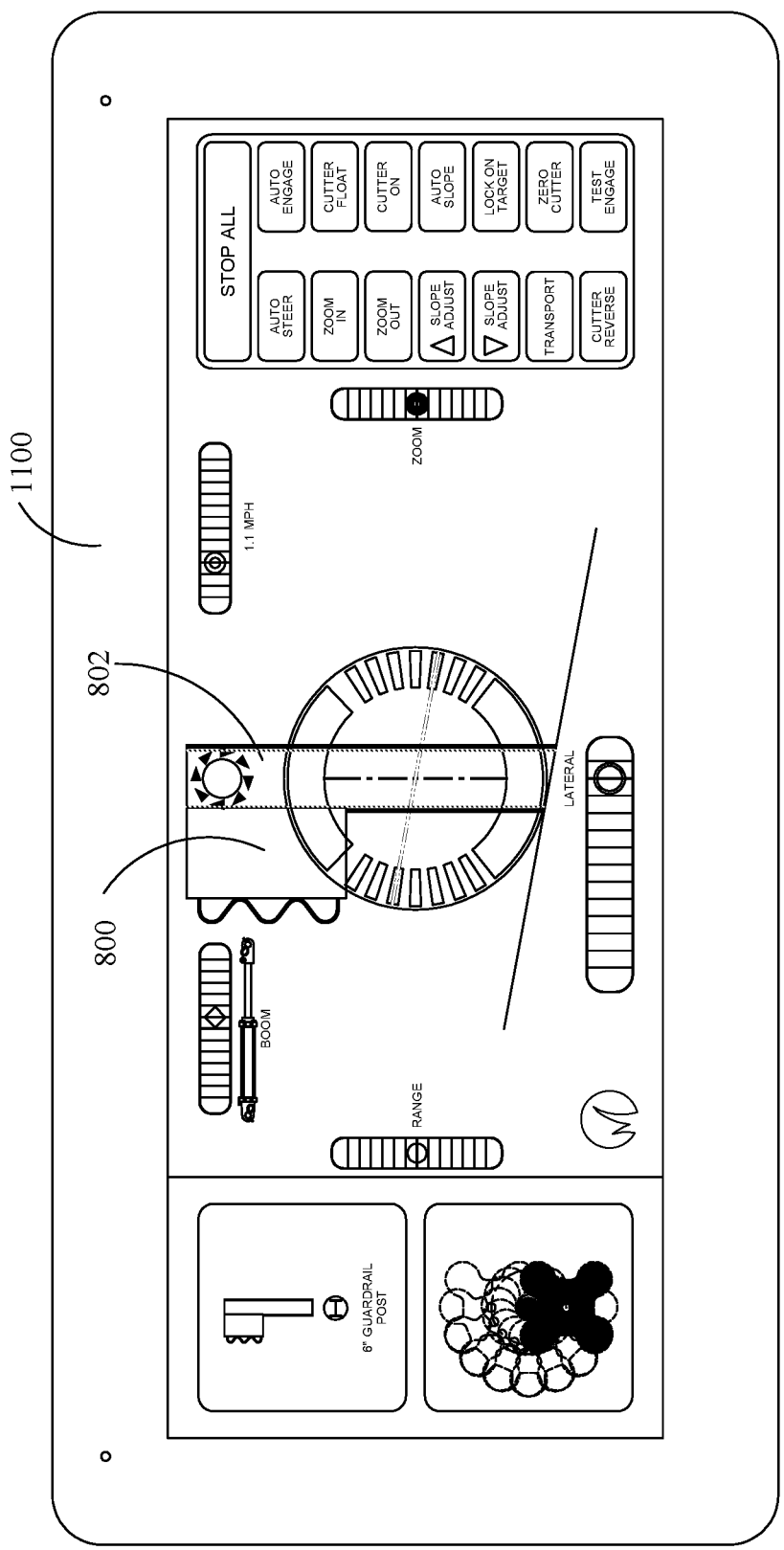
FIG. 28 is a sample active touch display for the trimming system.

As seen in FIG. 15, the slope adjusting assembly 300 can be in electronic communication with a slope control circuit 500 having at least one of a slope sensor, a slope/radar proximity sensor 502, a linear cylinder position sensor 1024, a torque sensor, an ultrasonic sensor, a video alignment camera 1018, and combinations thereof. The slope control circuit 500 can be configured for positioning the slope adjusting assembly 300 and controlling the rotator motor 108 to rotate the cutting head assembly 100 and laterally adjust the cutting head assembly 100 position relative to the carrier assembly 200.

The rotary trimming attachment 150 slope control circuit 500 can have a controller configured to transform sensor data into at least one control signal that is transmitted to the slope adjusting assembly 300, thereby positioning and maintaining the cutting head assembly 100 generally parallel with the ground below. The slope control circuit 500 controller can be configured to simultaneously control the rotator motor 108 and lateral actuator 106 to maintain a circle-of-avoidance in the range of about 0.0 to 0.75 inches. The circle-of-avoidance is generally defined as the distance between the cutting head assembly 100 and an approaching stationary object such as a guard rail post 802. The slope control circuit 500 can further have a user interface such as a manual control switch, a multi-function joystick 1102, or a touch screen such as an active touch display 1100.

The rotary trimming attachment 150 can be used to trim around stationary objects, such as a guard rail post 802, using the method steps of: positioning the cutting head assembly 100 in contact with the ground using manual controls; instructing the slope control circuit 500 to enter float-mode for the cutting head assembly 100; extending a boom assembly 400 to align the cutting head assembly 100 with the stationary object 802; aligning the cutting head assembly 100 with the slope of the ground to establish a preset slope parameter in the slope control circuit 500; maintaining and adjusting the preset slope parameter using the slope control circuit 500; adjusting the cutting head assembly 100 position to establish and store a zero-start position; engaging the blade drive motor 110; energizing the slope control circuit 500 to sense and maintain a circle-of-avoidance of the cutting head assembly 100 relative to stationary object 802; and, returning the cutting head assembly 100 to the stored zero-start position.

The method can also adjust the float-mode using a slope adjusting assembly 300 attached to a boom assembly 400 portion of the rotary trimming attachment 150, thereby allowing casters 202 on a carrier assembly 200 to be in continuous contact with the ground. The method can further align the cutting head assembly 100 position using manual controls, video image, slope/radar proximity sensors 502, and combinations thereof. Course boom position adjustments can be made manually and fine boom position adjustments can be made automatically by the slope control circuit 500 to extend and retract the shafts of the float/lift cylinders 302, 304, 410 and maintain the preset slope parameter. Adjustments to the zero-start rotational and lateral position in the slope control circuit can be made such that forward 608 and reverse 609 travel will properly nest and engage the cutting head assembly 100 with the stationary object 802.

The circle-of-avoidance can be maintained by simultaneously rotating the cutting head assembly 100 and adjusting the lateral 600 position of the cutting head assembly 100 during forward 608 and reverse 609 travel. Providing sufficient cutting head assembly 100 rotation between the zero-start position and a finish position can allow the cutting head assembly 100 to engage with all ground-level vertical surfaces of the stationary object 802 while maintaining the circle of avoidance 1000.

Attaching the rotary trimming attachment 150 to a vehicle 700 which maintains about constant travel speed in the forward 608 direction during mowing operations allows for efficient operation and well-groomed vegetation. If the operator mistakenly swings the rotary trimming attachment 150 into contact with an object, the pivoting boom assembly 400 will slide inside the aperture of the boom pivot retainer plate 412 in forward 608 and/or reverse 609 directions in reaction to the undesired strike of the object. A biasing element 422 can retain and return the boom assembly 400 to a desired operational position until an undesired strike occurs.

Additionally, many control variables are encountered when operating a trimming system for trimming vegetation on roadways, fence lines, around objects, with varying conditions in a continuous motion from within the safety of a carrier vehicle, tractor, utility vehicle, or truck. When properly controlled, the trimming system greatly reduces or eliminates the need for roadside trimming crews, adding to the overall speed, efficiency, and safety of trimming operations around stationary objects. Examples of stationary objects include trees, signposts, guard rail posts, barrier posts, light bases, etc.

The trimming system adjusts automatically to varying conditions including slope, spacing of objects and distance from roadway. The system uses an extending boom 402, a reach boom 404, a float boom 406, a free-floating cutting head assembly 100 supported on a carrier assembly 200 by two or more height adjustable casters 202 with adjustable slide assembly, a slope adjusting mechanism such as hydraulic cylinder or electric linear actuator controlled by the operator and held on slope by an integrated slope/radar proximity sensor 502 and cylinder. The rotational cutting head assembly 100 is rotated by a hydraulic or electric servo rotator motor 108 capable of input and varying torque to keep stationary objects 802 engaged while trimming. A smart electric servo actuator or smart hydraulic cylinder serves as a lateral actuator 106 that moves the cutting head assembly 100 in and out to keep the cutting head assembly 100 engaged during the rotating process. The cutting head assembly 100 is first moved with adjustments on the slide 112 attached to carrier assembly 200, then the reach boom 404, then finally the extending boom 402. A hydraulic blade drive motor 110 can power the four rotating cutting blades 102 and one counter rotating center blade 104 with pressure sensor that can turn off drive motor 110 in case of entanglement with roadway or other debris. The unique design of the cutting blades 102 would lessen the possibility of entanglement and damaged when in contact with unknown objects. The trimming system 150 can use multiple sensors, ultrasonic, mechanical, and or proximity to ensure optimum placement of the cutting head assembly 100 in relation to the object being trimmed. Sensors and controller 504 can also control the cutting head assembly 100 rotation and the complex movement around the object. The trimming system 150 low profile would allow it to reach under low hanging obstructions such as guard rails or tree limbs. The free-floating cutting head assembly 100 would have the ability to provide uniform cutting height without constant monitoring and adjustments by the operator. The extendable boom 402 would be protected by a breakaway hydraulic cylinder or springs that would allow the boom to move in the opposite direction of travel 1038, avoiding damage in case of operator error.

Auto steer and speed control maybe incorporated to steer a parallel line to the target line in the direction of travel 1038 using an auto steer servo 1008 and a throttle servo 1010. Auto steer can incorporate a series of proximity sensors (radar, ultrasonic, lidar, laser, etc.) and/or GPS receiver(s) 1012, pre-programmed and adjustable during operation, for calculating and maintaining the optimum distance to the target line with the use of an auto steer servo 1008 mounted on the carrier vehicle. Autospeed/throttle can also incorporate an odometer sensor 1016 to regulate the carrier vehicle travel speed to maximize efficiency and avoid operator over-driving the trimming sequence thru the use of a programable throttle servo 1010.

Sensors used by the turf trimming system can include: odometer 1016, slope sensor 1020, proximity sensors 502, linear cylinder position sensors 1024, torque sensors, ultrasonic proximity sensors, video alignment camera 1018, lidar (light detection and ranging) sensors 1018, and GPS 1012. Actuators used by the turf trimming system can include: smart hydraulic cylinders, smart electric linear actuators, smart electric linear and rotary servo-actuators, electric rotary motor, hydraulic rotary motor.

Example control hardware and software can include an electronic integrated controller having a non-transitory computer-readable storage medium configured with instructions executable by one or more processors to cause the one or more processors to receive input from a plurality of sensors and actuators and transmit conditioned control signals to the carrier vehicle 700 and rotary trimming attachment 150, manual control switches, joystick 1102, object recognition integration software with artificial intelligence (AI), and carrier vehicle 700 auto steer and speed control.

During operation, an operator would place the cutting head assembly 100 in contact with the ground using manual controls and then place boom in float mode using the active touch display 1100, thereby allowing the cutting head casters 202 to be in continuous contact with the ground. The operator would then extend the main extending boom to align the cutting head assembly 100 with the first object manually or using video 1018 and/or proximity sensors 502. The operator would then manually align the cutting head assembly 100 with the slope of the ground. After initial alignment the slope/radar sensor 502 would then maintain the slope with any adjustments needed to the slope cylinder. As the slope changes the operator would need to manually input changes using the active touch display 1100 and the multi-function joystick 1102, with again the slope/radar sensor 502 maintaining this adjusted preset slope parameter. Once the operator has all alignments set with the "zero start position" of the cutting head assembly 100, he would engage the drive motor for the cutting blades, turn on automatic integrated controls and proceed forward. The "zero start position" would be remembered by the controller and return the cutting head assembly 100 to this same position in rotation and extension, after completion of each trimming sequence. The "zero start position" is critical in that it allows the cutting head assembly 100 full rotation around the object. If multiple targets are along a similar target line, auto steer can be engaged to keep the carrier vehicle traveling in a true parallel line to the target line. auto throttle can also be engaged similarly if there are multiple targets along the target line to insure the optimum operational speed. Upon engaging the first object the rotation servo motor 108 or hydraulic motor 108 would start the cutting head assembly 100 rotating in a clockwise rotation and maintain proximity with the object using torque sensors, ultrasonic sensors and proximity sensors. At the same time the rotation starts the same sensors would change the cutting head assembly 100 position on the cutting head assembly 100 slides by means of lateral hydraulic cylinder 106 or electric linear servo actuator 106 to maintain the circle of avoidance 1000 thru the cutting process. The circle of avoidance 1000 is close enough to allow full rotation of the cutting head assembly 100 around the object (approx. ½) and not so far as to disengage from the object during forward movement of the carrier vehicle. Movement of the cutting head assembly 100 on the lateral cutter head slides needs to be fast, predictable, and precise, this could be enhanced with coordinated movement of reach boom and main extending boom. As the cutting head assembly 100 moves to the midpoint of the object or equal to the radius of the circle of avoidance 1000 the cutting head assembly 100 will begin to slide back towards the object, allowing the cutting head assembly 100 to rotate around the backside of the object thus completing the first cycle. After disengaging from the first object the cutting head assembly 100 will return to the predetermined "zero start position" ready to engage the next object or be put in transport mode ready to travel.

Figure 14:
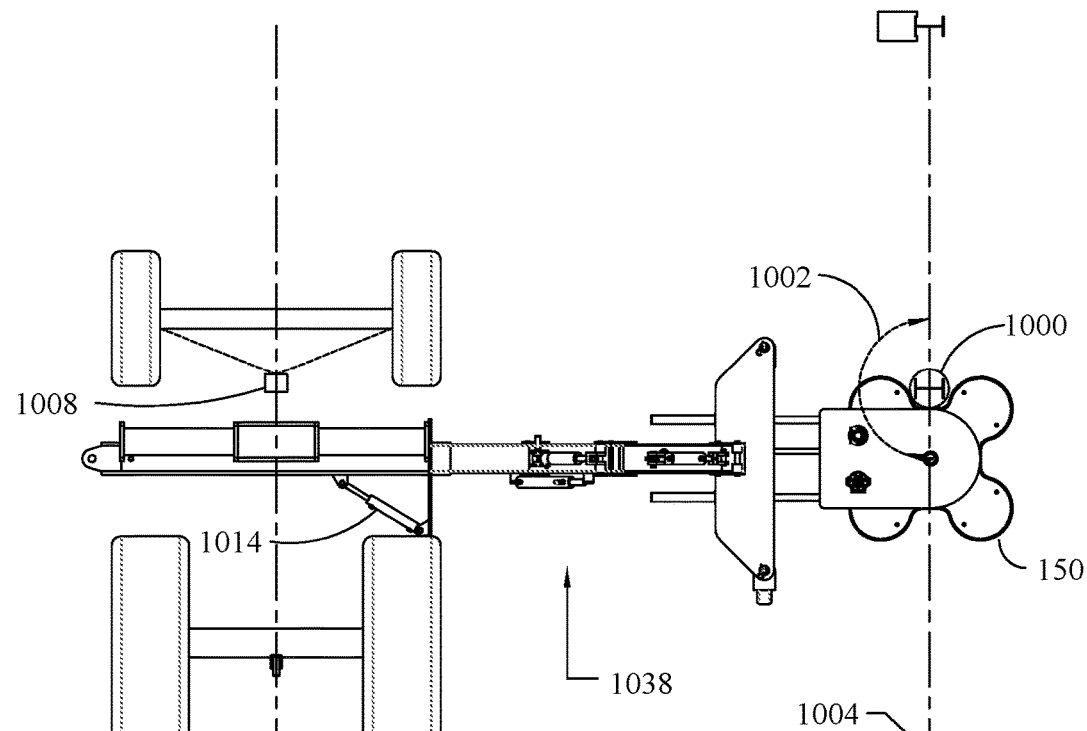
Figure 13:
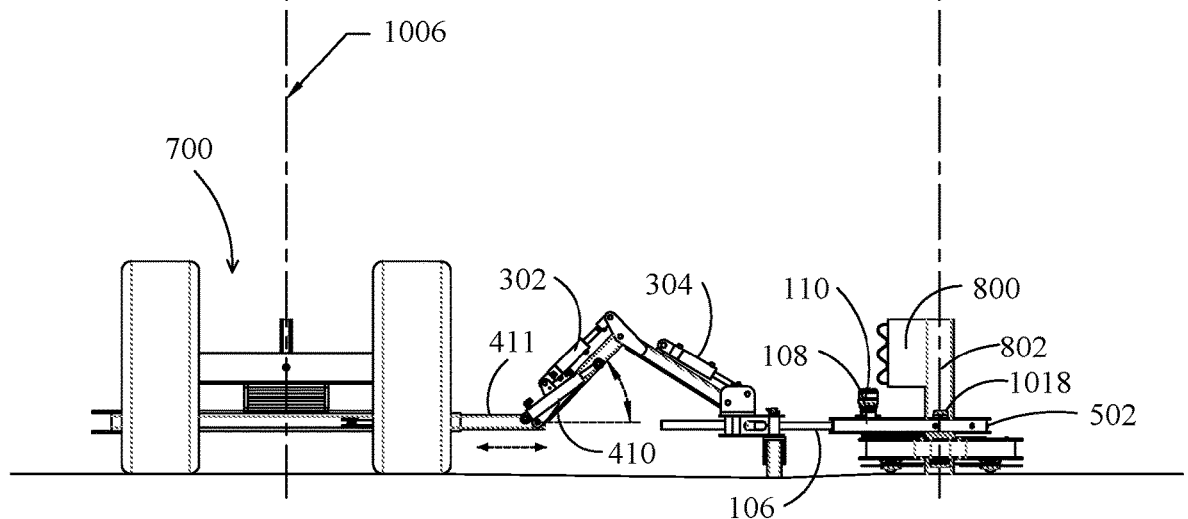
FIGS. 13/14 are a rear and top view of a trimming system showing initial engagement position with a target stationary object.
Figure 16:
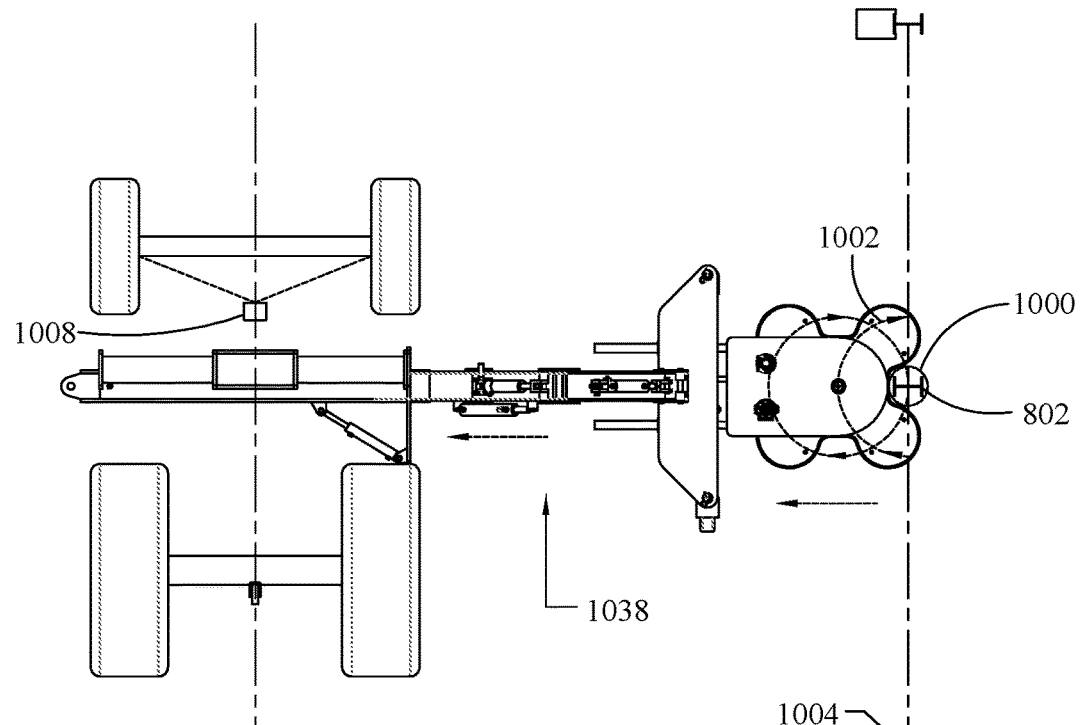

A typical sequence of operation for the turf trimming system is shown if FIGS. 13-18. As seen in FIGS. 13 and 14, an operator first selects controller manual mode to; 1) move the carrier vehicle in parallel position to target object, 2) move trimmer carrier casters in contact with ground using manual control, 3) select target preset parameter (tree, signpost, guard rail post, barrier post, light base) for example, tree@3-inch circle of avoidance, 4) place controller in engage target mode to turn on sensors, place actuators in "zero" position, set float cylinder to "float", set slope cylinder to preset parameter, and allow operator to adjust slope, 5) manually engage target using video 1018 image and joystick control until target is "locked on", or video 1018 centerline aligned with target centerline 1004 using boom cylinder to center trimmer on target. Then, as shown in FIGS. 15-18, the operator selects controller automatic (auto) mode to; 1) place control in auto trimmer mode, with manual override, such that as the carrier vehicle moves forward parallel to target, the controller maintains preset slope parameter, and centerline zero alignment using lidar, proximity sensor, video object recognition (AI), slope/radar sensor 502, boom cylinder 411, and reach cylinders 410, 2) start trimmer drive motor, 3) when trimmer gets to preset distance to target parameter, as determined by the circle of avoidance (COA) 1000 proximity sensors, trimming sequence starts, 4) as trimmer carrier vehicle 700 continues parallel to target on the carrier vehicle parallel travel path 1006, trimmer sequence (TS) 1036 starts cutting head assembly 100 rotation and retraction in response to controller 504 commands generated in response to forward or reverse carrier vehicle distance of travel (CDT) 1040 via onboard odometer 1016, using rotator motor 108 and lateral actuator 106. If more travel is needed first reach cylinder 410 and then boom cylinder 411 are used, 5) when CDT equals the approximate radius of the cutting head path 1002, the lateral actuator extends while cutter continues to rotate per preset parameters. Lidar and or proximity sensors continue to maintain COA and override preset parameters as required, 6) when cutter rotation equals 180 degrees and CDT equals diameter of COA all alignment systems return to zero and automatically seek new target or are cancelled by operator.

This written description uses examples of the disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a trimming system for trimming around stationary objects, comprising;
    selecting manual mode in a trimmer integrated control system, comprising a controller, to perform the following steps:
        moving the trimming system comprising a carrier vehicle, a rotary trimming attachment, and the trimmer integrated control system into initial position such that the carrier vehicle travel path is parallel to a target stationary object centerline;
        placing rotary trimming attachment carrier assembly casters in contact with the ground;
        selecting a target stationary object preset to establish trimming parameters comprising at least one of circle of avoidance (COA) and cutting head path;
        placing the trimmer integrated control system in engage target mode;
        manually engaging the target stationary object with a cutting head assembly of the rotary trimming attachment; then
    selecting auto mode in the trimmer integrated control system to perform the following steps:
        activating auto control in the controller, with manual override, to set a plurality of alignment preset parameters to zero and move the carrier vehicle in a forward direction parallel to the target centerline, while the controller maintains a preset slope and a centerline zero alignment;
        energizing a cutting head assembly drive motor;
        initiating controller trimming sequence when the cutting head assembly reaches a preset distance to the target stationary object as determined by at least one proximity sensor and defined by the circle of avoidance;
        continuing controller trimming sequence, as the carrier vehicle travels, to start the cutting head assembly rotation using a rotator motor and retraction of the cutting head assembly;
        providing additional cutting head assembly lateral motion, if needed, using controller commands to first a reach cylinder and then a boom cylinder;
        maintaining the circle of avoidance, with manual override, until a forward or reverse carrier vehicle distance of travel (CDT) equals the approximate radius of the cutting head path;
        returning the alignment preset parameters to zero when the cutting head assembly rotation equals 180 degrees and CDT equals the diameter of the COA; and
        seeking a new target stationary object or cancelling trimming operations.

2. The method of claim 1, wherein the engage target mode is selected to activate sensors, position actuators in zero position, set float cylinders to float mode, and set slope cylinders to preset mode, thereby allowing the operator to adjust slope control settings, in manual mode.

3. The method of claim 1, wherein manually engaging the target stationary object with the cutting head assembly uses a video image, boom cylinders, and joystick control until target stationary object is locked on, such that the video centerline is aligned with the target centerline, in manual mode.

4. The method of claim 1, wherein the controller maintains preset slope and centerline zero alignment using at least one of LiDAR sensors, proximity sensors, video object recognition artificial intelligence (AI), auto steer/speed controller logic, slope sensors, boom cylinders, and reach cylinders, in auto mode.

5. The method of claim 1, wherein the controller trimming sequence, as the carrier vehicle travels, starts the cutting head assembly rotation using the rotator motor and cutting head assembly retraction using a lateral actuator, in response to controller commands generated from forward/reverse carrier vehicle distance of travel (CDT) inputs as sensed by an odometer, in auto mode.

6. The method of claim 5, wherein the circle of avoidance is maintained until the CDT equals the approximate radius of the cutting head path, by extending the lateral actuator while the cutting head assembly continues to rotate per preset parameters, in auto mode.

* * * * *